(12) United States Patent
Kleman

(10) Patent No.: US 10,145,720 B2
(45) Date of Patent: Dec. 4, 2018

(54) FMCW RADAR LEVEL GAUGE WITH ENHANCED TIMING CONTROL

(71) Applicant: Rosemount Tank Radar AB, Mölnlycke (SE)

(72) Inventor: Mikael Kleman, Vreta Kloster (SE)

(73) Assignee: ROSEMOUNT TANK RADAR AB, Mölnycke (SE)

(*) Notice: Subject to any disclaimer, the term of this patent is extended or adjusted under 35 U.S.C. 154(b) by 373 days.

(21) Appl. No.: 15/196,233

(22) Filed: Jun. 29, 2016

(65) Prior Publication Data

US 2018/0003539 A1    Jan. 4, 2018

(51) Int. Cl.
| | | |
|---|---|---|
| G01F 23/284 | (2006.01) | |
| G01S 13/34 | (2006.01) | |
| G01S 7/35 | (2006.01) | |
| G01F 23/00 | (2006.01) | |
| G01F 25/00 | (2006.01) | |

(52) U.S. Cl.
CPC .............. *G01F 23/284* (2013.01); *G01S 7/35* (2013.01); *G01S 13/34* (2013.01); *G01F 23/0061* (2013.01); *G01F 23/0076* (2013.01); *G01F 25/0061* (2013.01)

(58) Field of Classification Search
CPC .............. G01F 23/284; G01F 23/2962; G01F 25/0061; G01F 23/0061; G01F 23/0076; G01S 13/88; G01S 13/08; G01S 7/35; G01S 13/343; G01S 13/103; G01S 13/34; G01S 7/02; G01S 15/101; G01S 7/032; H01Q 15/14; H01Q 1/225; H01Q 13/02
See application file for complete search history.

(56) References Cited

U.S. PATENT DOCUMENTS

| | | | | |
|---|---|---|---|---|
| 6,229,476 | B1 * | 5/2001 | Lutke | G01F 23/284 324/332 |
| 6,867,729 | B2 * | 3/2005 | Berry | G01F 23/284 342/118 |
| 7,823,446 | B2 * | 11/2010 | Nilsson | G01F 23/284 73/290 R |
| 9,291,443 | B2 | 3/2016 | Kleman et al. | |
| 2005/0264441 | A1 * | 12/2005 | Abrahamsson | G01F 23/284 342/124 |
| 2015/0338261 | A1 * | 11/2015 | Mueller | G01S 7/032 342/124 |

* cited by examiner

*Primary Examiner* — Olumide Ajibade Akonai
(74) *Attorney, Agent, or Firm* — Westman, Champlin & Koehler, P.A.

(57) ABSTRACT

A radar level gauge system controllable between a measurement state and a signal processing state. In the measurement state a first timing signal circuit is enabled, a microwave signal source generates a transmit signal with a time-varying frequency being related to first timing signals from the first timing signal generating circuitry, and a sampler samples a mixer signal at sampling times related to the first timing signals. in the signal processing state, the first timing signal circuit is disabled, and a signal processor determines the filling level based on the sampled values of the mixer signal using second timing signals from a second timing signal generating circuit.

16 Claims, 3 Drawing Sheets

FMCW RADAR LEVEL GAUGE WITH ENHANCED TIMING CONTROL

FIELD OF THE INVENTION

The present invention relates to a radar level gauge system and to a method of determining a filling level using a radar level gauge system.

TECHNICAL BACKGROUND

Since the radar level gauge was developed as a commercial product in the 1970's and 1980's, frequency modulated continuous wave (FMCW) has been the dominating measuring principle for high accuracy applications. An FMCW measurement comprises transmitting into the tank a signal which is swept over a frequency range in the order of a few GHz. For example, the signal can be in the range 9-10.5 GHz, 25-27 GHz, or 77-80 GHz. The transmitted signal is reflected by the surface of the product in the tank and a surface echo signal, which has been delayed a certain time, is returned to the gauge. The surface echo signal is mixed with the transmitted signal to generate a mixer signal, having a frequency equal to the frequency change of the transmitted signal that has taken place during the time delay. If a linear sweep is used, this difference frequency, also referred to as an intermediate frequency (IF), is proportional to the distance to the reflecting surface. The mixer signal is often referred to as an IF signal.

More recently, the FMCW principle has been improved, and today typically involves transmitting not a continuous sweep but a signal with stepped frequency with practically constant amplitude. When the transmitted and received signals are mixed, each frequency step will provide one constant piece of a piecewise constant IF signal, thus providing one "sample" of the IF signal. In order to unambiguously determine the frequency of the piecewise constant IF signal, a number of frequencies, N, greater than a number stipulated by the sampling theorem will be required. The distance to the reflecting surface is then determined using the frequency of the IF signal in a similar way as in a conventional FMCW system. Typical values can be 200-300 IF periods at 30 m distance divided in 1000-1500 steps.

It is noted that also a continuous IF signal, resulting from a continuous frequency sweep, may be sampled in order to allow digital processing.

Although highly accurate, conventional FMCW systems (continuous as well as stepped) are relatively power hungry, making them less suitable for applications where power is limited. Examples of such applications include field devices powered by a two-wire interface, such as a 4-20 mA loop, and wireless devices powered by an internal power source.

SUMMARY

In view of the above, a general object of the present invention is to provide for more energy-efficient filling level determination using the FMCW measurement principle.

According to a first aspect of the present invention, it is therefore provided a radar level gauge system for determining a filling level of a product in a tank, the radar level gauge system comprising: a microwave signal source controllable to generate an electromagnetic transmit signal with a time-varying frequency; a propagation device connected to the microwave signal source and arranged to propagate the electromagnetic transmit signal towards a surface of the product in the tank, and to propagate an electromagnetic surface echo signal resulting from reflection of the transmit signal at the surface back from the surface; a mixer connected to the microwave signal source and to the propagating device and configured to mix the transmit signal and the surface echo signal to form a mixer signal; sampling circuitry connected to the mixer for sampling the mixer signal to provide sampled values of the mixer signal; first timing signal generating circuitry connected to the microwave signal source and to the sampling circuitry for providing first timing signals to the microwave signal source and to the sampling circuitry; signal processing circuitry for determining the filling level based on the sampled values of the mixer signal; second timing signal generating circuitry connected to the signal processing circuitry for providing second timing signals to the signal processing circuitry; and measurement control circuitry for controlling the radar level gauge system between a measurement state in which the first timing signal generating circuitry is enabled and a signal processing state in which the first timing signal generating circuitry is disabled, wherein: in the measurement state, the measurement control circuitry: controls the microwave signal source to generate the transmit signal with the time-varying frequency being related to the first timing signals from the first timing signal generating circuitry; and controls the sampling circuitry to sample the mixer signal at sampling times related to the first timing signals from the first timing signal generating circuitry; and in the signal processing state, the measurement control circuitry: controls the signal processing circuitry to determine the filling level based on the sampled values of the mixer signal using the second timing signals from the second timing signal generating circuitry.

It should be noted that the signal propagation device may be any suitable radiating antenna or transmission line probe. Examples of antennas include a horn antenna, a rod antenna, an array antenna and a parabolic antenna, etc. Examples of transmission line probes include a single line probe (Goubau probe), a twin line probe and a coaxial probe etc.

The present invention is based on the realization that an important reason for the relatively high energy consumption of conventional radar level gauge systems of the FMCW type is the need for highly accurate and temperature stable timing. To provide for this highly accurate and temperature stable timing, high performance timing circuitry may be employed, such as so-called temperature compensated crystal oscillators (TCXO). However, a TCXO has a relatively high power consumption, such as in the order of mW. The present inventor has now realized that the highly accurate and temperature stable timing is only necessary for part of the filling level determination procedure, and that the stability and accuracy of the timing is far less important for the remainder of the filling level determination procedure.

By providing at least two different timing signal generating circuits, and enabling different ones of these during timing critical measurement operations and during signal processing, respectively, a significant reduction of the energy consumption of the radar level gauge system can be provided for. This, in turn, enables, or at least facilitates, the use of FMCW-type radar level gauge systems in locally energized or loop-powered applications.

In particular, a relatively accurate and stable first timing signal generating circuit may only be enabled for generation of the transmit signal and sampling of the mixer signal, and a less accurate and less temperature stable second timing generation circuit may be used for the further processing of the sampled values of the mixer signal.

Thus, according to embodiments, the first timing signal generating circuitry may be more temperature stable than the second timing signal generating circuitry. In other words, the first timing signal generating circuitry may be configured to provide said first timing signals exhibiting a first frequency change resulting from a given non-zero temperature change; and the second timing signal generating circuitry may be configured to provide the second timing signals exhibiting a second frequency change resulting from the given temperature change, where the first frequency change is less than the second frequency change.

Further, the first timing signal generating circuitry may exhibit a smaller phase noise than the second timing signal generating circuitry.

An example maximum rated phase noise (@1 KHz Carrier Offset) for the first timing signal generating circuitry may be −110 dBc/Hz or less, and an example maximum rated phase noise (@1 KHz Carrier Offset) for the second timing signal generating circuitry may be −80 dBc/Hz or more.

To provide the desired high accuracy and temperature stability of the first timing signals, the first timing signal generating circuitry may advantageously comprise a crystal oscillator, preferably a temperature compensated crystal oscillator (TCXO). Various suitable TCXO:s are widely available and well known to one of ordinary skill in the relevant art.

According to various embodiments of the radar level gauge system of the present invention, the second timing signal generating circuit may advantageously be an RC-oscillator. Although not being as accurate and temperature stable as a TCXO, the power consumption of a suitable RC-oscillator is far lower. For the same oscillation frequency range, the power consumption of an RC-oscillator may be less than one tenth of the power consumption of a TCXO.

For improved performance and reduced cost, the signal processing circuitry and the second timing signal generating circuitry may be provided in the same integrated circuit, which may be referred to as a measurement control unit or 'MCU'. In other words, the second timing signal generating circuitry may be constituted by a built-in oscillator (internal clock) in an integrated circuit.

According to embodiments, the MCU may additionally include the sampling circuitry, which may advantageously sample and AD-convert the mixer signal (IF-signal) from the mixer. Furthermore, the MCU may additionally at least partly include the measurement control circuitry.

Moreover, the first timing signal generating circuitry may be provided outside the above-mentioned integrated circuit (the MCU). Advantageously, the first timing signal generating circuitry may be provided in the form of at least one discrete timing circuit, such as at least one TCXO.

According to embodiments of the present invention, the radar level gauge system may further comprise switching circuitry connected between an energy source and the first timing signal generating circuitry. The energy source may be local or remote.

Furthermore, the measurement control circuitry may be configured to: enable the first timing signal generating circuitry by controlling the switching circuitry to connect the first timing signal generating circuitry to the energy source; and disable the first timing signal generating circuitry by controlling the switching circuitry to disconnect the first timing signal generating circuitry from the energy source.

In embodiments, the measurement control circuitry may additionally configure the MCU to operate based on the external first timing signal generating circuitry when the first timing signal generating circuitry has been enabled, and configure the MCU to operate based on the internal second timing signal generating circuitry before disabling the first timing signal generating circuitry.

Furthermore, the level gauge system may advantageously further comprise a local energy store for providing electrical energy for operation of said level gauge system. The local energy store may, for example, comprise a battery and/or a super capacitor.

Moreover, the level gauge system may further comprise wireless communication circuitry, such as a radio transceiver, for wireless communication with a remote system.

According to a second aspect of the present invention, it is provided a method of determining a filling level of a product in a tank using a radar level gauge system comprising a microwave signal source; a propagation device connected to the microwave signal source; a mixer connected to the microwave signal source and to the propagating device; sampling circuitry connected to the mixer; first timing signal generating circuitry connected to the microwave signal source and to the sampling circuitry; signal processing circuitry; second timing signal generating circuitry connected to the signal processing circuitry; and measurement control circuitry, the method comprising the steps of: enabling, by the measurement control circuitry, the first timing signal generator; providing, by the first timing signal generator, first timing signals to the microwave signal source and to the sampling circuitry; generating, by the microwave signal source, an electromagnetic transmit signal with a time-varying frequency being related to the first timing signals from the first timing signal generator; propagating, by the propagation device, the electromagnetic transmit signal towards a surface of the product in the tank; propagate, by the propagation device, an electromagnetic surface echo signal resulting from reflection of the transmit signal at the surface back from the surface; mixing, by the mixer, the transmit signal and the surface echo signal to form a mixer signal; sampling, by the sampling circuitry, the mixer signal to provide sampled values of the mixer signal at sampling times related to the first timing signals from the first timing signal generating circuitry; disabling, by the measurement control circuitry, the first timing signal generating circuitry; providing, by the second timing signal generator, second timing signals to the signal processing circuitry; and determining, by the signal processing circuitry, the filling level based on the sampled values of the mixer signal using the second timing signals from the second timing signal generating circuitry.

It should be noted that the above steps need not necessarily be carried out in any particular order.

Further effects and variations of the present second aspect of the invention are largely similar to those described above with reference to the first aspect of the invention.

In summary, the present invention thus relates to a radar level gauge system controllable between a measurement state and a signal processing state. In the measurement state a first timing signal circuit is enabled, a microwave signal source generates a transmit signal with a time-varying frequency being related to first timing signals from the first timing signal generating circuitry, and a sampler samples a mixer signal at sampling times related to the first timing signals. in the signal processing state, the first timing signal circuit is disabled, and a signal processor determines the filling level based on the sampled values of the mixer signal using second timing signals from a second timing signal generating circuit.

BRIEF DESCRIPTION OF THE DRAWINGS

These and other aspects of the present invention will now be described in more detail, with reference to the appended drawings showing an exemplary embodiment of the invention, wherein.

DETAILED DESCRIPTION OF EXAMPLE EMBODIMENTS

Figure 1:
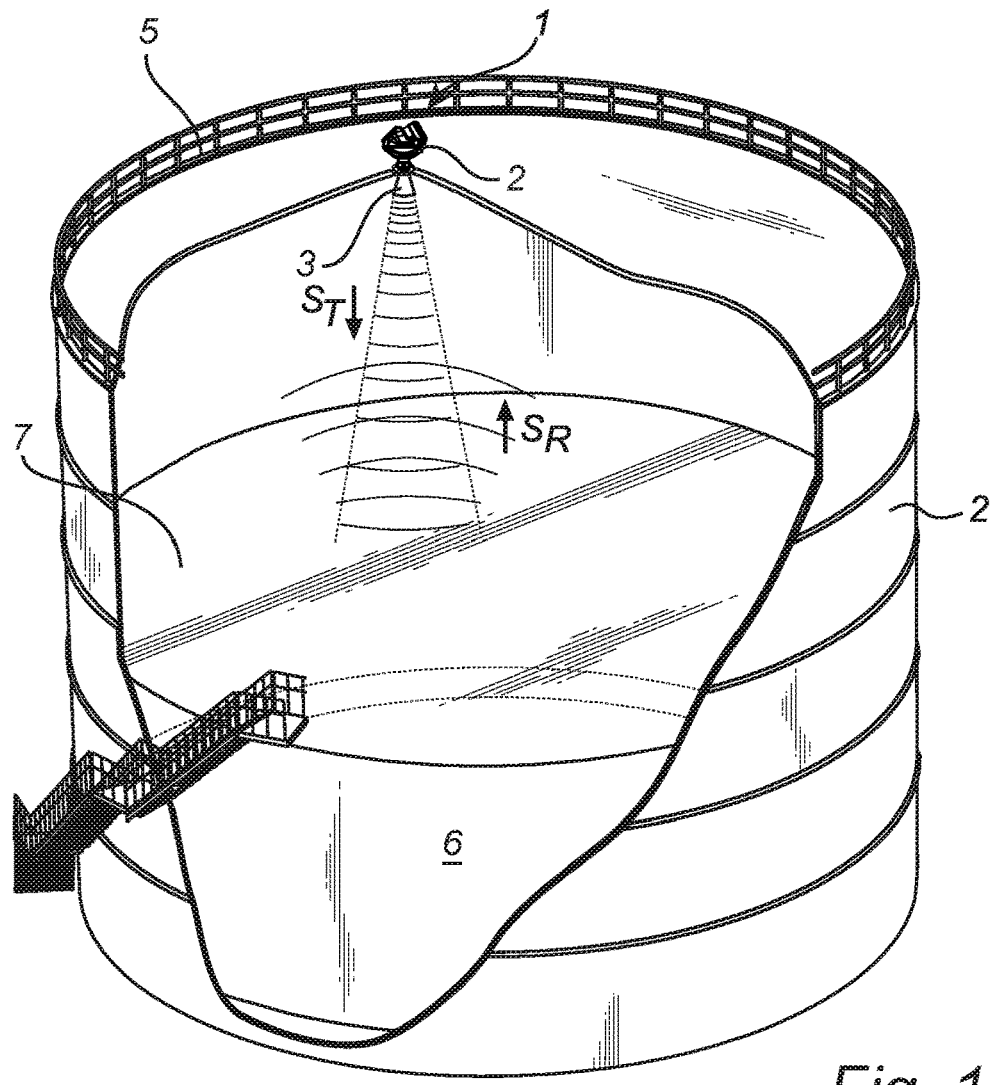
FIG. 1 schematically shows an exemplary tank with an embodiment of the radar level gauge system according to the present invention arranged to determine the filling level of a product in the tank.

FIG. 1 schematically illustrates a radar level gauge system 1 comprising a measurement unit 2 and a signal propagation device, here shown in the form of a horn antenna 3. It should, however, be noted that the signal propagation device may equally well be another type of radiating antenna, or a transmission line probe. The radar level gauge system 1 is arranged on top of a tank 5 for determining the filling level of a product 6 in the tank 5.

When measuring the filling level of the product 6 in the tank 5, the radar level gauge system 1 transmits an electromagnetic transmit signal $S_T$ by the horn antenna 3 towards the surface 7 of the product 6, where the signal is reflected as an electromagnetic surface echo signal $S_R$. The distance to the surface 7 of the product 6 is then determined based on the travel time of the electromagnetic surface echo signal $S_R$ (from the radar level gauge system 1 to the surface 7 and back). From the travel time, the distance to the surface, generally referred to as ullage, can be determined. Based on this distance (the ullage) and known dimensions of the tank 5, the filling level can be deduced.

Using the radar level gauge system according to various embodiments of the present invention, the travel time is determined based on the frequency difference between the frequency-modulated transmit signal and the surface reflection signal. This type of measurement scheme is often referred to as FMCW (Frequency Modulated Continuous Wave).

Figure 2:
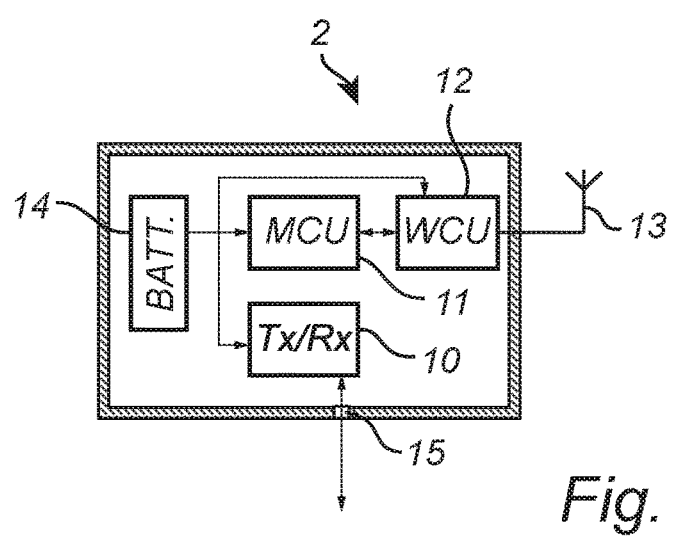
FIG. 2 is a schematic illustration of the measurement unit comprised in the radar level gauge system in FIG. 1.

Referring to the schematic block diagram in FIG. 2, the measurement unit 2 of the radar level gauge system 1 in FIG. 1 comprises a transceiver 10, a measurement control unit (MCU) 11, a wireless communication control unit (WCU) 12, a communication antenna 13, an energy store, such as a battery 14, and a tank feed-through 15.

As is schematically illustrated in FIG. 2, the MCU 11 controls the transceiver 10 to generate, transmit and receive electromagnetic signals. The transmitted signals pass through the tank feed-through 15 to the horn antenna 3 (not shown in FIG. 2), and the received signals pass from the horn antenna 3 through the tank feed-through 15 to the transceiver 10.

As was briefly described above with reference to FIG. 1, the MCU 11 determines the filling level of the product 6 in the tank 5 based on the phase difference between the transmit signal $S_T$ and the surface echo signal $S_R$. The filling level is provided to an external device, such as a control center from the MCU 11 via the WCU 12 through the communication antenna 13. The radar level gauge system 1 may advantageously be configured according to the so-called WirelessHART communication protocol (IEC 62591).

Although the measurement unit 2 is shown to comprise an energy store 14 and to comprise devices (such as the WCU 12 and the communication antenna 13) for allowing wireless communication, it should be understood that power supply and communication may be provided in a different way, such as through communication lines (for example 4-20 mA lines).

The local energy store need not only comprise a battery, but may alternatively, or in combination, comprise a capacitor or super-capacitor.

Figure 3:
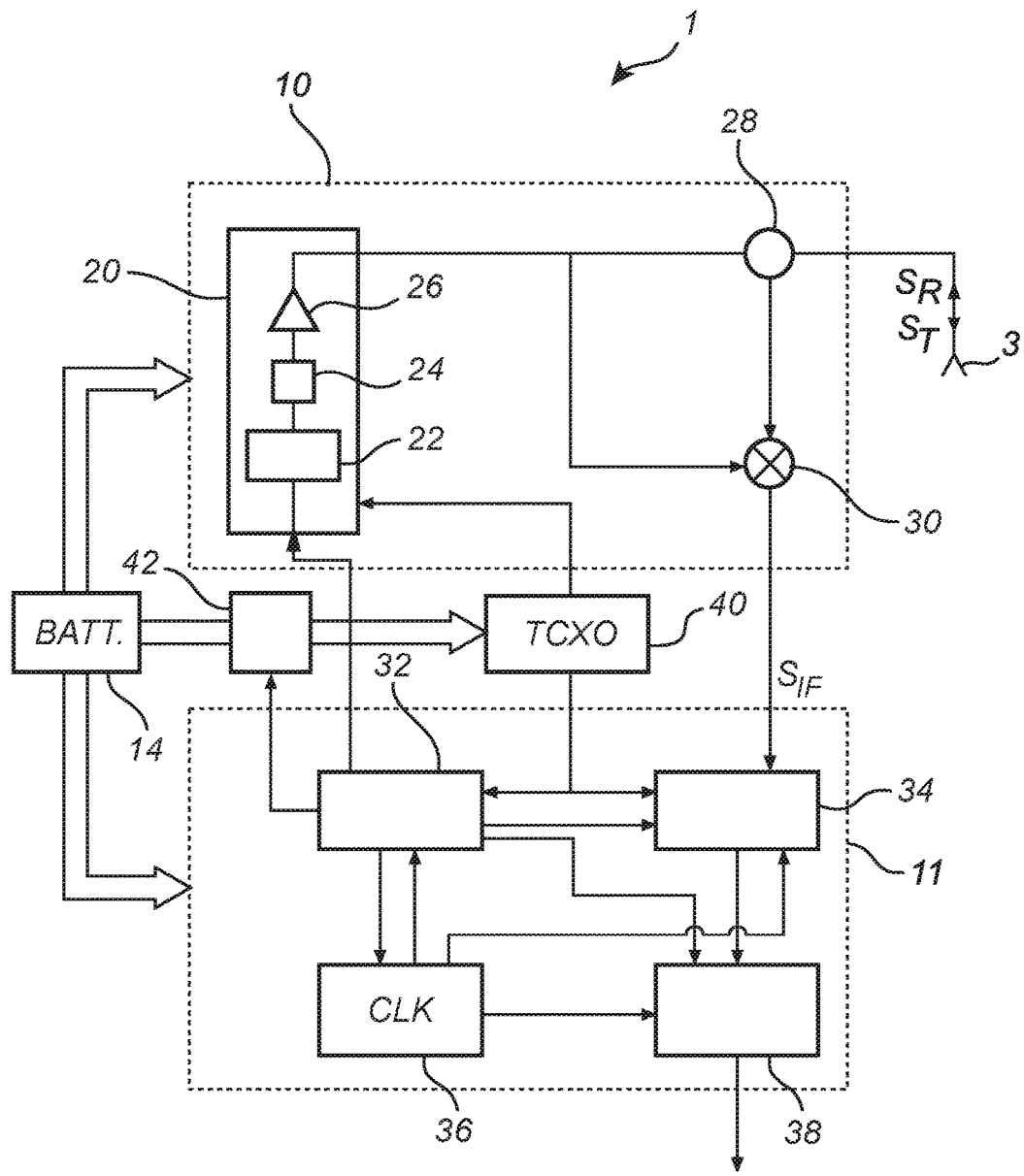
FIG. 3 is a schematic block diagram of a radar level gauge system according to an embodiment of the present invention.

Referring now to FIG. 3, there is shown a more detailed block diagram of the transceiver 10 and MCU 11 in FIG. 1 according to an embodiment of the present invention.

As is schematically shown in FIG. 3, the transceiver 10 here includes a microwave signal source 20, a power divider 28 and a mixer 30. The transmit signal generator 20 comprises a frequency controllable signal generator, here in the form of a PLL (phase locked loop) 22, frequency multiplying circuitry such as a frequency doubler 24, and a low noise amplifier (LNA) 26. The output of the microwave signal source 20 is connected to the antenna 3 through the power divider 28, and to the mixer 30. The antenna 3 is also connected to the mixer 30 through the power divider 28.

The MCU 11 here comprises measurement control circuitry in the form of measurement controller 32, sampling circuitry in the form of sampler 34, an internal clock circuit 36, and signal processing circuitry in the form of signal processor 38. The sampler 34 may, for example, comprise a sample-and-hold circuit in combination with an A/D-converter, or be realized as a sigma-delta converter.

In addition, the radar level gauge system 1 in FIG. 3 comprises a local energy source, in the form of battery 14, an external timing circuit, here in the form of TCXO 40, and a switching circuit 42 coupled between the battery 14 and the TCXO 40.

As is schematically indicated by block arrows in FIG. 3, energy for operation of the radar level gauge system 1 is provided from the battery 14 to the transceiver 10, the MCU 11, and the TCXO 40, via the switching circuit 42. As is also schematically shown in FIG. 3, by line arrows, the measurement controller 32 of the MCU 11 is connected to various circuitry as indicated in FIG. 3 to control measurement operations carried out by the radar level gauge system 1. In particular, the measurement controller 32 controls operation of the microwave signal source 20, the sampler 34, the internal clock circuit 36, the signal processor 38, and the external timing circuit 40.

Further, the sampler 34 is connected to the mixer 30 to sample the mixer signal $S_{IF}$ output by the mixer 30 and provides sampled values of the mixer signal $S_{IF}$ in digital form to the signal processor 38, which may advantageously comprise a memory, although this is not explicitly shown in FIG. 3.

To achieve high measurement performance, precise and stable timing control of the microwave signal source 20 and synchronization of the sampling carried out by the sampler 34 with the generation of the transmit signal $S_T$ are necessary. However, as was explained further above, the precise and temperature stable timing needed for this may require more energy than can sustainably be supplied by a local energy store of reasonable capacity or a measurement loop, such as a so-called 4-20 mA measurement loop.

To provide for the desired high measurement performance in combination with a relatively low energy consumption (equivalent to average power consumption), the measurement controller 32 is configured to control the radar level gauge system 1 between a measurement state and a signal processing state.

When transitioning the radar level gauge system 1 to the measurement state, the measurement controller 32 enables the TCXO 40 by controlling the switch 42 to connect the TCXO 40 to the battery 14. Thereafter, the measurement operations for which accurate and temperature stable timing are important are carried out as will be described below in greater detail with further reference to the flow-chart in FIG. 4.

When transitioning the radar level gauge system 1 from the measurement state to the signal processing state, the measurement controller 32 disables the TCXO 40 by controlling the switch 42 to disconnect the TCXO 40 from the battery 14. Thereafter, the digital IF-signal values that were sampled in the measurement state are processed by the signal processor 38, using timing signals from the internal clock circuit 36, to determine the filling level. This procedure as well as the transitioning from the measurement state to the signal processing state will also be described below in greater detail with further reference to the flow-chart in FIG. 4.

While the elements of the transceiver 10 are typically implemented in hardware, and form part of an integrated unit normally referred to as a microwave unit, at least some portions of the MCU 11 may typically be embodied by software modules executed by an embedded processor. The invention is not restricted to this particular realization, and any implementation found suitable to realize the herein described functionality may be contemplated.

Figure 4:
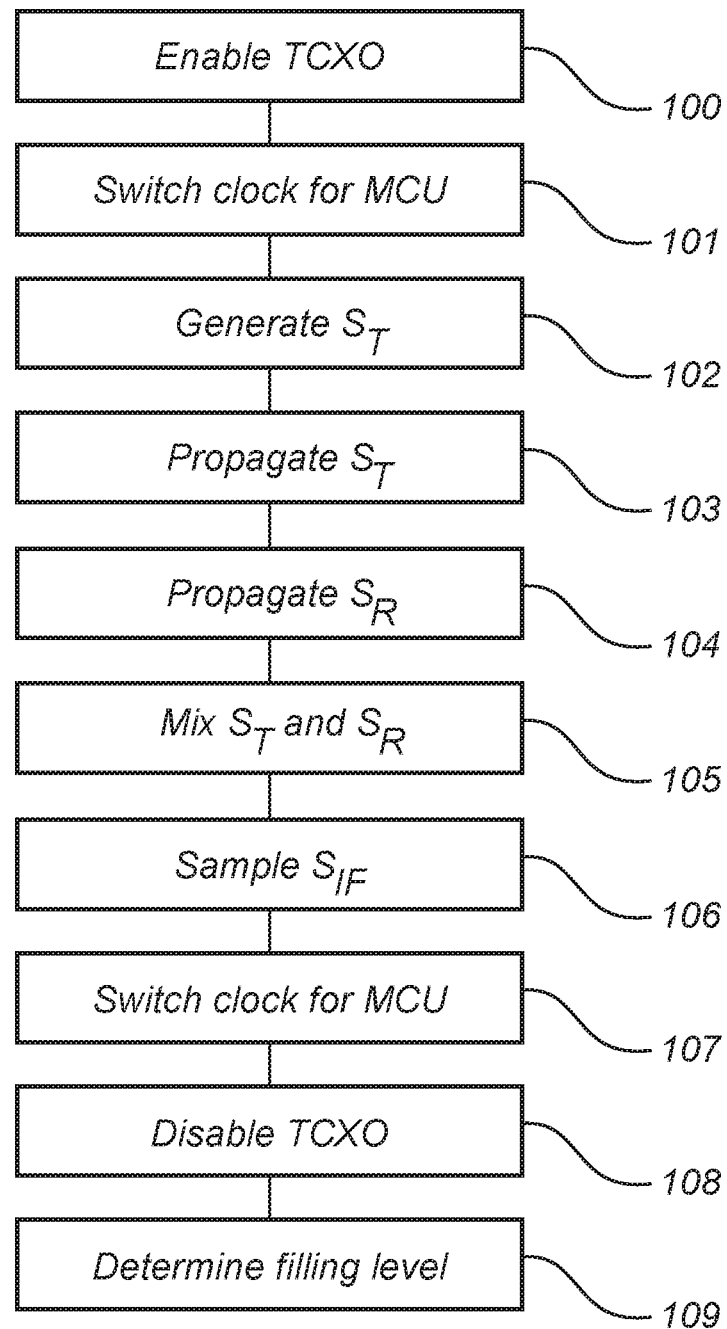
FIG. 4 is a flow-chart outlining an embodiment of the method according to the present invention.

Having described the structural configuration of the radar level gauge system 1 in FIG. 1 which is illustrated in FIG. 3, a method according to an example embodiment of the present invention will now be described with reference to FIG. 4. The block diagram in FIG. 3 will also be referred to concerning the structure of the radar level gauge system 1 in which the method is implemented.

In a first step 100, the measurement controller 32 of the MCU 11 enables the TCXO 40 by controlling the switch 42 to connect the TCXO to the battery 14. As a result, the TCXO 40 provides first timing signals with a stable and accurate frequency. It should be noted that this is only one example of how a suitable timing circuit can be enabled or activated. Devising several other ways of enabling a timing circuit are well within the reach of one of ordinary skill in the art.

When the TCXO 40 has been powered by the battery 14 and outputs stable timing signals, the measurement controller 32, in step 101, controls the MCU 11 to operate using timing signals from the TCXO 40 instead of using timing signals from the internal clock circuit 36. When this handover or clock switch is completed, the accurate and temperature stable timing signals from the TCXO are used for the timing of the MCU 11 instead of the timing signals from the internal clock circuit 36.

Subsequently, when the TCXO 40 has been enabled, and the switch from the internal clock circuit 36 to the external TCXO 40 has been completed, the measurement controller 32 activates the transceiver 10 and controls, in step 102, the microwave source 20 to generate the transmit signal $S_T$ having a time-varying frequency that is related to the timing signals from the TCXO 40. In the exemplary embodiment of FIG. 3, the first timing signals from the TCXO 40 provide a stable and accurate reference for the PLL 22, and the measurement controller 32 controls the PLL to change the frequency of the signal output by the PLL 22 at times that are related to the first timing signals provided by the TCXO 40. In the example microwave source configuration in FIG. 3, the signal output by the PLL is frequency multiplied by the frequency multiplier 24, and amplified by the LNA 26, before being propagated, in step 103, by the antenna 3 towards the surface of the product in the tank.

A surface echo signal $S_R$ resulting from reflection of the transmit signal $S_T$ at the surface of the product in the tank is propagated back to the transceiver 10 by the antenna in the subsequent step 104, and the transmit signal $S_T$ and the surface echo signal $S_R$ are mixed in the mixer 30 in step 105 to provide an IF-signal $S_{IF}$.

The IF-signal $S_{IF}$ is sampled (and A/D-converted) by the sampler 34 of the MCU 11 in step 106. The IF-signal $S_{IF}$ is sampled by the sampler 34 at sampling times that are related to the first timing signals provided by the TCXO 40 so that the sampling times in the sampler 34 are synchronized with the frequency shifts of the transmit signal $S_T$ generated by the microwave signal source 20. The digital sampled values resulting from the sampling operation may be stored in a memory that may be comprised in the signal processor 38.

Now that the timing critical parts of the measurement operation have been performed, it is time for the measurement controller 32 to transition the radar level gauge system 1 from the measurement state to the signal processing state. Thus, in step 107, the measurement controller 32 controls the MCU to operate using second timing signals from the internal clock circuit 36 instead of using first timing signals from the external TCXO 40. When this clock switching operation has been completed, the measurement controller 32 disables the TCXO 40, in step 108, by controlling the switch 42 to disconnect the TCXO 40 from the battery 14. This will obviously result in an end to the energy consumption by the TCXO 40.

Finally, in step 109, the signal processor 38 determines the filling level based on the sampled values of the IF-signal $S_{IF}$ stored in memory. Since the processing of the stored sampled values is not timing critical, it can be performed with the less accurate and stable internal clock circuit 36.

The person skilled in the art realizes that the present invention by no means is limited to the preferred embodiments described above. On the contrary, many modifications and variations are possible within the scope of the appended claims.

What is claimed is:

1. A radar level gauge system for determining a filling level of a product in a tank, said radar level gauge system comprising:
    a microwave signal source controllable to generate an electromagnetic transmit signal with a time-varying frequency;
    a propagation device connected to said microwave signal source and arranged to propagate said electromagnetic transmit signal towards a surface of said product in the tank, and to propagate an electromagnetic surface echo signal resulting from reflection of said transmit signal at said surface back from said surface;
    a mixer connected to said microwave signal source and to said propagating device and configured to mix said transmit signal and said surface echo signal to form a mixer signal;
    sampling circuitry connected to said mixer for sampling said mixer signal to provide sampled values of the mixer signal;

first timing signal generating circuitry connected to said microwave signal source and to said sampling circuitry for providing first timing signals to said microwave signal source and to said sampling circuitry;

signal processing circuitry for determining said filling level based on said sampled values of the mixer signal;

second timing signal generating circuitry connected to said signal processing circuitry for providing second timing signals to said signal processing circuitry; and measurement control circuitry for controlling the radar level gauge system between a measurement state in which said first timing signal generating circuitry is enabled and a signal processing state in which said first timing signal generating circuitry is disabled, wherein:

in said measurement state, said measurement control circuitry:

controls said microwave signal source to generate said transmit signal with said time-varying frequency being related to said first timing signals from said first timing signal generating circuitry; and controls said sampling circuitry to sample said mixer signal at sampling times related to said first timing signals from said first timing signal generating circuitry; and in said signal processing state, said measurement control circuitry:

controls said signal processing circuitry to determine said filling level based on said sampled values of the mixer signal using said second timing signals from said second timing signal generating circuitry.

2. The radar level gauge system according to claim 1, wherein said measurement control circuitry is connected to said first timing signal generating circuitry for enabling and disabling said first timing signal generating circuitry.

3. The radar level gauge system according to claim 1, wherein said first timing signal generating circuitry exhibits a smaller phase noise than said second timing signal generating circuitry.

4. The radar level gauge system according to claim 1, wherein said first timing signal generating circuitry comprises a crystal oscillator.

5. The radar level gauge system according to claim 4, wherein said first timing signal generating circuitry comprises a temperature compensated crystal oscillator.

6. The radar level gauge system according to claim 1, wherein said second timing signal generating circuitry is an RC-oscillator.

7. The radar level gauge system according to claim 1, wherein said signal processing circuitry and said second timing signal generating circuitry are provided in the same integrated circuit.

8. The radar level gauge system according to claim 7, wherein said sampling circuitry is included in said integrated circuit.

9. The radar level gauge system according to claim 7, said first timing signal generating circuitry being provided outside said integrated circuit.

10. The radar level gauge system according to claim 1, further comprising switching circuitry connected between an energy source and said first timing signal generating circuitry.

11. The radar level gauge system according to claim 10, wherein said measurement control circuitry is configured to:

enable said first timing signal generating circuitry by controlling said switching circuitry to connect said first timing signal generating circuitry to said energy source; and disable said first timing signal generating circuitry by controlling said switching circuitry to disconnect said first timing signal generating circuitry from said energy source.

12. The radar level gauge system according to claim 1, wherein, in said measurement state, said measurement control circuitry controls said microwave signal source to generate said transmit signal in the form of a microwave signal exhibiting a sequence of different frequencies.

13. The radar level gauge system according to claim 12, wherein, in said measurement state, said measurement control circuitry controls said microwave signal source to generate said transmit signal in the form of a microwave signal exhibiting at least one frequency sweep with a monotonically varying frequency.

14. The radar level gauge system according to claim 13, wherein said at least one frequency sweep comprises a plurality of frequency steps.

15. A method of determining a filling level of a product in a tank using a radar level gauge system comprising a microwave signal source; a propagation device connected to said microwave signal source; a mixer connected to said microwave signal source and to said propagating device; sampling circuitry connected to said mixer; first timing signal generating circuitry connected to said microwave signal source and to said sampling circuitry; signal processing circuitry; second timing signal generating circuitry connected to said signal processing circuitry; and measurement control circuitry, said method comprising the steps of:

enabling, by said measurement control circuitry, said first timing signal generator;

providing, by said first timing signal generator, first timing signals to said microwave signal source and to said sampling circuitry;

generating, by said microwave signal source, an electromagnetic transmit signal with a time-varying frequency being related to said first timing signals from said first timing signal generator;

propagating, by said propagation device, said electromagnetic transmit signal towards a surface of said product in the tank;

propagate, by said propagation device, an electromagnetic surface echo signal resulting from reflection of said transmit signal at said surface back from said surface;

mixing, by said mixer, said transmit signal and said surface echo signal to form a mixer signal;

sampling, by said sampling circuitry, said mixer signal to provide sampled values of the mixer signal at sampling times related to said first timing signals from said first timing signal generating circuitry;

disabling, by said measurement control circuitry, said first timing signal generating circuitry;

providing, by said second timing signal generator, second timing signals to said signal processing circuitry; and determining, by said signal processing circuitry, said filling level based on said sampled values of the mixer signal using said second timing signals from said second timing signal generating circuitry.

16. The method according to claim 15, wherein:

said measurement control circuitry comprises switching circuitry connected between an energy source and said first timing signal generating circuitry; and said step of enabling said first timing signal generating circuitry comprises connecting said first timing signal generating circuitry to said energy source using said switching circuitry; and said step of disabling said first timing signal generating circuitry comprises disconnecting said first timing signal generating circuitry from said energy source using said switching circuitry.

* * * * *